United States Patent [19]
Kinkead et al.

[11] Patent Number: 4,724,552
[45] Date of Patent: Feb. 16, 1988

[54] APPARATUS FOR AUTOMATICALLY MAINTAINING A PREDETERMINED DESIRED LEVEL OF WATER IN A SWIMMING POOL, AND THE LIKE

[75] Inventors: Clifford W. Kinkead, Phoenix; David W. Kinkead, Glendale, both of Ariz.

[73] Assignee: Aqua Systems, Inc., Phoenix, Ariz.

[21] Appl. No.: 870,727

[22] Filed: Jun. 4, 1986

Related U.S. Application Data

[62] Division of Ser. No. 715,383, Mar. 25, 1985, Pat. No. 4,686,718.

[51] Int. Cl.⁴ .................................. F16K 1/18
[52] U.S. Cl. .......................................... 4/508
[58] Field of Search ..................... 4/507–509; 137/428, 412, 414, 415, 412

[56] References Cited

U.S. PATENT DOCUMENTS

| | | | |
|---|---|---|---|
| 2,781,772 | 2/1957 | Russell | 137/414 |
| 2,811,167 | 10/1957 | Bott | 137/414 |
| 3,895,402 | 7/1975 | Page | 4/508 |
| 3,908,206 | 9/1975 | Grewing | 4/508 |
| 4,211,249 | 7/1980 | Richards | 4/508 |
| 4,373,220 | 2/1983 | Selsted | 4/508 |
| 4,607,399 | 8/1986 | Yovanofski | 4/508 |

OTHER PUBLICATIONS

Product Engineering Ad, "Design Features"; May 11, 1959.

*Primary Examiner*—Henry J. Recla
*Assistant Examiner*—L. J. Peters
*Attorney, Agent, or Firm*—Charles P. Padgett, Jr.

[57] ABSTRACT

An apparatus for automatically monitoring the level of water in a swimming pool, or the like, by monitoring the level of a float within a float chamber supported by water siphoned from the pool system, for detecting when the level of water has fallen a predetermined amount or distance below a predetermined desired level and for controlling the input of fresh water into the pool system in response to the detected level for restoring the water in the pool to the predetermined desired level as determined by the position of the float on the siphoned water within the float chamber being restored to a float position indicative of said predetermined desired level of water in the pool.

28 Claims, 6 Drawing Figures

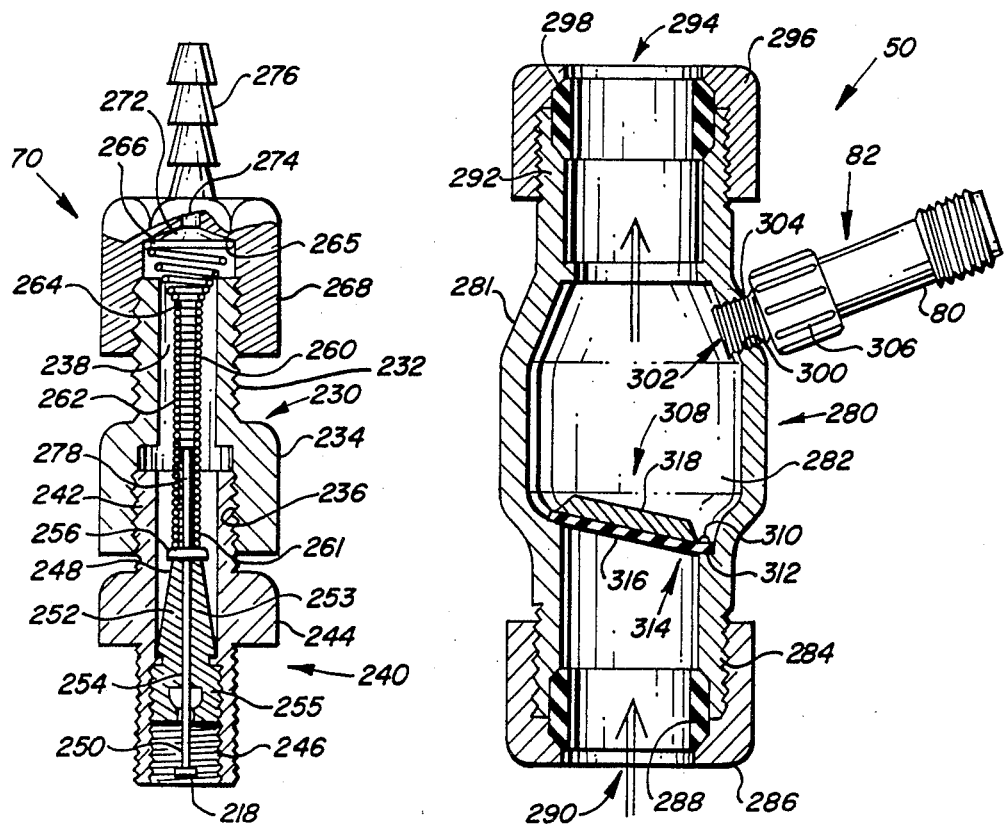

APPARATUS FOR AUTOMATICALLY MAINTAINING A PREDETERMINED DESIRED LEVEL OF WATER IN A SWIMMING POOL, AND THE LIKE

This is a Divisional Application of Ser. No. 715,383, filed on Mar. 25, 1985 by Clifford W. Kinkead and David W. Kinkead for a Method and Apparatus for Automatically a Predetermined Desired Level of Water in a Swimming Pool or the Like, now U.S. Pat. No. 4,686,718 issued on Aug. 18, 1987.

BACKGROUND OF THE INVENTION

1. Field of the Invention

The invention relates generally to automatic systems for maintaining a predetermined desired level of water in a swimming pool or the like, and more particularly to an automatic system for monitoring the actual level of water in the pool by the position of a float supported within a float chamber on water siphoned from the recirculation system of the pool, detecting whenever the level of water in the pool is at least a predetermined distance or amount below a predetermined desired level, as indicated by the float position, and for controlling the input of fresh water into the pool in response to the detected level for restoring the water level in the pool to the predetermined desired level, as indicated by the float having been returned to said float level indicative of the predetermined desired water level by the additional water siphoned into the float chamber from the pool or pool circulation system.

2. Description of the Prior Art

Outdoor swimming pools of all shapes and sizes, and of all types and configurations, are in relatively wide use today for recreation, exercise, therapy, and entertainment. Most such pools are designed or constructed to operate with a predetermined desired water level that must be maintained within relatively close limits to insure proper operation of the water circulation and filter systems associated with the pool. This presents a problem in the upkeep and maintainance of the pool for most people. Such problems have included the necessity of removing foreign matter from the pool by filtering or the like; a requirement for adding various chemical agents to control the level of bacteria, the amount of algae present and the clarity of the water; and, particularly in hot dry or arid areas, the necessity for adding additional water to maintain a predetermined desired level of water in the pool to make up for water losses due to evaporation, spillage, and the like, in order to insure proper operation of the systems at all times.

Typically, foreign matter has been filtered from the pool water through a recirculation filtration system which includes a circulating pump, a filter, and a fluid conduit connecting the filtration system in a circulation-type path between a pool outlet and a pool inlet. Such prior art filtration systems have commonly been automatically times so as to provide an automated removal of foreign matter with only periodic maintenance of the pump and filter being required of the pool owner.

Failure to fill the pool to the predetermined desired level after use of evaporation has lowered the level of water in the pool, may result in damage to the associated pump, heater, filter or recirculation system as a whole. A sufficient drop in the level of water in the pool will render the recirculation system, or at least the skimmer portion, totally inoperative. Typically, the water level in the swimming pool has been maintained manually by continually observing the level visually and periodically adding water as required from a garden hose, or the like. Since this requires personal attention by the pool owner it is a definite inconvenience, and attempts have been made to develop a system for automatically adjusting the water level in the pool.

Typically, such prior art attempts involved the mounting of a simple float valve at pool-side. When the pool level drops, the float valve opens a pipe leading to a fresh water source, and water is added to the pool until the raised level then closes the float valve. However, such systems present several additional problems, including the necessity for building an expensive addition or anomaly to the pool wall in order to mount the float valve, and the potential for damage or injury being afflicted upon the valve, and upon users of the pool by the valve are serious problems. The fact that the pool-side location exposes the entire valve mechanism to the corrosive action of the various chemical agents in the pool leads to even further serious problems and complications.

Various techniques of the prior art are known for filling and/or draining swimming pools, and these are generally described in U.S. Pat. Nos. 2,739,939; 2,809,752; 2,891,845; 3,386,197; 3,739,405; 3,848,627; 3,895,402; 3,908,206; 3,997,925; 4,211,249; and 4,373,220. None of the prior art attempts have actually solved the above-stated problems without creating even more additional problems of their own.

In nearly every case, the retrofitting of an existing pool with equipment for automatically controlling the water level usually involved expensive and undesirable reconstruction of the pool and the surrounding decking or at least required complicated valve systems, conduits, and controls. Therefore, an urgent and long-felt need continues to exist for an automatic pool level-adjusting system which does not require that a structural anomaly be added to the pool itself, which is protected from access by users of the pool, which is at least substantially isolated from the corrosive chemical agents, bacteria, and algae within the pool water itself, and which is relatively simple, easy-to-install, and maintenance-free thereafter.

BRIEF DESCRIPTION OF THE DRAWINGS

FIG. 4 is a sectional view of the bleeder valve assembly of FIG. 3;

FIG. 5 is a side view, partially in section, of the flapper valve of FIG. 1; and FIG. 6 is a sectional view of the diaphragm valve apparatus of FIG. 1.

SUMMARY OF THE INVENTION

Figure 1:
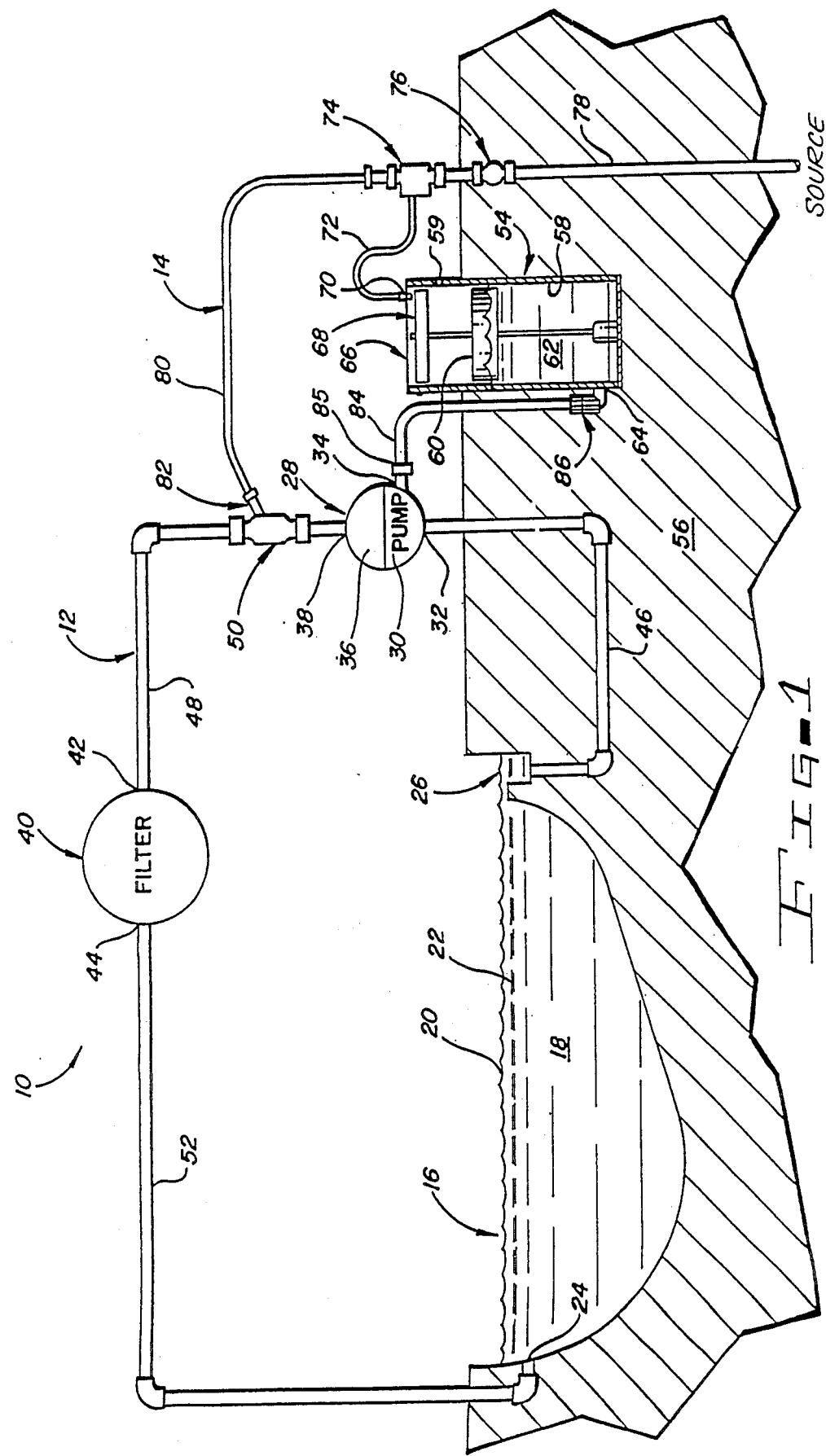
FIG. 1 is a sectional view of a swimming pool and associated pool water recirculation system employing the pool water level control system of the present invention.

It is an object of this invention to provide an apparatus for automatically adjusting or controlling the level of water in a swimming pool or the like.

It is another object of the present invention to provide an automatic monitoring, level-detecting, and level-adjusting apparatus whose installation does not require extensive modification of the walls or deck of the pool or the like.

It is a further object of the present invention to provide an apparatus for automatically adjusting the level of water in a swimming pool which is remote from the pool itself.

It is yet another object of the present invention to provide an apparatus for monitoring the level of water in a swimming pool by siphoning water from the pool recirculation system.

It is still another object of the present invention to provide an isolation valve, which permits bi-directional seepage, but blocks a forced flow in either direction, so that the water level in a float chamber can be isolated from the circulation system when the pump is operated, while permitting siphoning to occur when the pump is turned off.

It is still a further object of the present invention to provide a pool water level control system which does not require excavation other than placing the float chamber at least partially below the water level in the pool.

It is yet a further object of the present invention to provide an apparatus for automatically controlling the level of water in a swimming pool wherein the monitoring of the actual water level in the pool is accomplished by monitoring the level of a float supported on water siphoned from the pool within a float chamber adjacent to the pool.

It is still another object of the present invention to provide a unique magnetic, over-the-center, toggle latch for insuring that the control system does not function until the actual water level in the pool drops a predetermined distance or amount below the predetermined desired water level.

These and other objects and advantages of the present invention are accomplished in an automatic control system for use in a swimming pool having a pool inlet, a pool outlet, a swimming pool water circulation system including filter means for cleaning the circulated pool water, and a pump for circulating the water therein.

The control system detects whenever the level of water in the swimming pool is at least a predetermined distance or amount below a predetermined desired water level and controls the input of fresh water into the pool in response to the detected level for restoring the water in the pool to said predetermined desired water level.

A float chamber housing is operatively disposed at least partially below the water level in the pool. The float chamber housing includes a float chamber, a float chamber inlet, and means for inputting only swimming pool water siphoned from at least one of the swimming pool and the water circulation system. A conduit means and check valve operatively couple the float chamber inlet to either the pool or the water circulation system for siphoning pool water into the float chamber until the water level therein is equal to the water level in the swimming pool, thereby serving as an indication of the level thereof.

A source of fresh water is provided, and a float within the float chamber monitors the float level therein as a measure or indication of the actual water level in the swimming pool. Actuation means responsive to the float means, falling at least a predetermined distance or amount below the float level indicative of the predetermined desired water level initiates a command signal, and the float means returning to the float level, indicative of the predetermined desired water level, terminates the command signal.

A second conduit means operatively couples the source of fresh water to at least one of the pool and the water circulation system for supplying fresh water thereto. A control valve is operatively disposed within the second conduit for selectively controlling the flow of fresh water into the pool so that the control valve is responsive to the command signal for supplying fresh water to the pool each time the pool level is detected to be below the predetermined desired level, and being responsive to the termination of the command signal to turn off the supply of fresh water into the pool whenever the pool level has been restored to the predetermined desired level, thereby automatically monitoring, detecting, and controlling the level of water in the pool.

The present invention also contemplates a swimming pool system having a pool inlet, a pool outlet, a water circulation system operatively coupling the outlet to the inlet for filtering the pool water circulating under control of a pump, and a source of fresh water under pressure within such a system. An improved system for automatically maintaining the pool filled to at least a predetermined desired water level includes means for (1) siphoning water from the water circulation system into a float chamber, (2) monitoring the level of water in the float chamber as an indication of the actual water level in the pool, (3) adding fresh water from a source directly to at least one of the pool and the water circulation system without passing through the float chamber whenever the monitoring step detects that the pool level has fallen at least a predetermined distance below the predetermined desired water level and (4) then terminating the supplying of fresh water whenever the monitoring step detects that the predetermined desired level has been restored.

DETAILED DESCRIPTION OF THE PREFERRED EMBODIMENT

The automatic control system of the present invention is for monitoring the water level in a container of water, such as a swimming pool, or the like, detecting when the level of water falls a predetermined amount, quanity, or distance below a predetermined desired level of water, and controlling the input or addition of liquid or water to the system for restoring the level to the predetermined desired level, as illustrated in the swimming pool system 10 of FIG. 1.

FIG. 1 illustrates a conventional swimming pool system 10 having a pool 16, a water circulation or recirculation system 12, and an automatic control system 14 associated therewith.

The swimming pool system 10 includes a conventional swimming pool 16 containing water 18, although any similar body of liquid in some type of pressured recirculation system could also be used with the present invention. For example, the system of the present invention could be used in the storage tanks of large evaporative cooler systems; to maintain water level in remotely-located livestock watering tanks; in water cooling towers; and the like. The swimming pool 16 is filled, in the preferred embodiment, with swimming pool water or water 18 having a swimming pool water level 20 and a predetermined desired water level 22. The swimming pool 16 includes a conventional swimming pool inlet 24 and a conventional swimming pool outlet 26. In the preferred embodiment, the swimming pool inlet 24 is shown as a simple inlet conduit that may be, for example, a conventional, pressure-operated, pool-cleaning apparatus such as an aerator which sprays the return or inlet water into the air to oxygenate it with water, or the like. Similarly, the swimming pool outlet 26 is preferably a conventional surface-skimming device located in a side wall of the pool 16 near the predetermined desired water level 22.

The swimming pool system 10 of FIG. 1 also includes a relatively conventional water recirculation or circulation system 12 for circulating and cleaning the swimming pool water 18 in the pool 16, and coupling the swimming pool outlet 26 to the swimming pool inlet 24. The swimming pool recirculation or conventional filtration system 12 includes a conventional swimming pool water pump 28 having a suction side 30 with a pump inlet 32 and a suction side outlet 34 as well as a pressure side 36 having a pump outlet 38. The recirculation system 12 also includes a conventional filter 40 having a filter inlet 42 and a filter outlet 44. The filter used is unimportant to the understanding of the present invention, and any conventional cartridge filter system, sand filter, diatomatious earth filter, or the like, can be used.

The circulation system 12 also includes a conduit or pipe 46 connected between the swimming pool outlet or skimmer 26 and the pump inlet 32. A second conduit or pipe 48 is connected between the pump outlet 38 and the filter input 42 of filter 40, and may include, as indicated in FIG. 1, a flapper valve assembly 50, as hereinafter described. A third pipe or conduit 52 is connected between the filter output or outlet 44 and the pool inlet 24. A complete or continuous recirculation path is therefore established between the swimming pool outlet 26 and the swimming pool inlet 24 to the swimming pool itself, and the circulation path 12 comprising the first conduit 46, pump 28, flapper valve 50, second conduit or pipe 48, filter 40, and third conduit 52. An important feature of the closed circulation system 12 of the present invention is the fact that the system 12 is "closed" or "unvented" to atmosphere so as to constitute a closed static circulatory system.

Typically, the circulation system may be operated by timing means, not shown, but well-known in the art, wherein the pump 28 is turned on and off periodically to activate and deactivate the circulation system depending on the need for filtration in the water 18 of the pool 16. Some systems may run under the control of various types of detectors for detecting the need for filtration in the water 18, and the like, as well, but this forms no part of the present invention.

The control system 14 of FIG. 1 includes a float chamber housing 54 buried at least partially in the ground, concrete, patio deck, surface material 56, or the like surrounding the pool, or somewhat adjacent to the pool 16, and at least a portion of the housing 54 is below the water level 20 of the pool 16, and preferably the housing 54 straddles the water level 20, as shown in FIG. 1. The float chamber housing 54 includes a generally cylindrical, water-tight, float chamber 58 containing a vertically positionable float member 60 supported on a column or quantity of siphoned pool water 62 within the float chamber 58. The housing 54 is "vented" or "open" to atmosphere, as indicated by reference numeral 66, and includes an actuation means 68, as hereinafter described, including a pressure relief valve apparatus 70 and a pressure conduit or tube 72. The input of the tube 72 is connected to the output of the pressure relief valve 70, while the outlet of tube 72 is connected to the control input of a pressure-operated diaphragm valve 74. The valve 74 has the valve input connected to the valve outlet of an anti-siphon valve 76 whose valve input is connected, via conduit or pipe 78, to a source of fresh water under pressure, such as the city water system, tap water, pump water, or the like. The output of the diaphragm valve 74 is connected, via conduit or tube 80, to the central input 82 of the flapper valve 50, as hereinafter described. Lastly, a two-way tube or conduit 84 is connected between the tube outlet 34 on the suction side 30 of the pump 28 and the single inlet conduit 64 of the float chamber 58. The two-way conduit 84 includes a check valve assembly 86, as hereinafter described.

The system of FIG. 1 utilizes a known principle of physics to accomplish water level-monitoring and detection. The principle of siphoning is unused or perhaps even unknown or unrecognized in the pool level control art. The principle of siphoning a liquid from a closed, static, circulatory system makes it possible, even when the system is positioned above the outside, or involves open or vented reservoirs, to siphon liquids having a differential level therebetween. This means that the static pressure in the circulation system 12 does not change the pressure in conduit 84 and the vented chamber 58, since the weight of the liquid under staticc pressure within the recirculation system 12 does not change the pressure coefficient between the pool 16 and the float chamber 58. Water 18 in the pool 16 and the siphoned water 62 in the float chamber 58 will seek equal level regardless of the elevated static pressures involved.

The control system 14 of the present invention provides an apparatus for monitoring the actual level of liquid or water 20 in the pool 16; for detecting when the level 20 of water 18 has dropped at least a predetermined distance or amount below a predetermined desired water level 22; and for controlling the replacement of lost water in periodic sequences, such as each time the timer system or the like enables the pump 28 to turn off, without the necessity of excavating the local terrain to install below water-level plumbing such as required in most of the systems of the prior art.

The detection of the actual water level 20 in the pool 16 is achieved, in the preferred embodiment of the present invention, as illustrated in FIG. 1, without replacing, monitoring, detecting, or refilling devices inside the actual pool 16 itself. While prior art systems require that water be drawn from the pool to a float chamber from below the actual water level 20 and be connected to an adjacent vessel, which must also be placed below the water level 20 of the pool 16, so the water of the pool 16 is transferred or supplied to an adjacent vessel, such as a float chamber, and the adjacent vessel filled to an equal level only by the pressure in the first vessel or the pool 16.

The present invention does not transfer fresh water through the chamber to the pool at all. It only transfers pool water from the pool 16 to the float chamber 58 by a siphoning effect when the pump is off, and not by sub-level pressure within the pool 16. The siphon principle of the present invention is preferably achieved by connecting a siphon tube or conduit 84 with one end attached to the float chamber inlet and the opposite end attached to the pump output 34 on the suction side 30 of the pump 28. The clean-out connection 34 of the pump 28 is readily available, and substantially all pool pumps provides a convenient and accessible way of siphoning water from the closed recirculation system to the float vessel 54. The clean-out connection or outlet 34 is normally provided with a filtering screen to prevent the entrance of dirt into the siphon tube 84, but this is well-known in the prior art and need not described in detail herein.

The opposite end of the siphon tube 84 is connected to the float chamber through a check valve which closes when suction in the siphon tube is created, as when the recirculating water in the system 12 is moving as the pump 28 is operated. The check valve 86 completely isolates the float chamber 58 from the recirculation system 12 as long as the pump 28 is operating. As soon as the timing means or recirculation loop control system turns off, the pump 28 stops, and the inertia of the water flowing in the closed static system of loop 12 continues for an instant, thereby causing the siphon tube 84 to be pressurized to open the check valve 86 thereby, assuring a siphoned flow of water into the float vessel and allowing the siphoning effect to draw pool water from the recirculation system 12 or the pool 16 into the float chamber 58 via tube 84. Eventually, sufficient water will be added by the control system 14, as hereinafter described, and the float level will be restored to that position indicative of the desired predetermined water level 20 in the pool 16. At this point, the actuation means 68 will close the valve 74 to terminate the flow of fresh water into the recirculation system 12 or pool 16 via flapper valve 50, and the system will again begin monitoring the actual level of water in the pool 16 until it has again detected that the water level has fallen a predetermined distance or amount below the predetermined desired water level.

Again, it is important to note that the recirculation system 12 is a closed static system which eliminates the need for any substantial underground excavation and permits the use of an open or vented float chamber in which only a portion of the float chamber 58 is below the actual water level 20 of the pool 16. There is no need for underground connections between a first point in the pool 16 below the water level 20 and a second point in the float chamber below the water level therein, nor is there a requirement that the siphon end of the tube 84 be connected to any specific location in the recirculation system, such as below the water level 20, as in the prior art. In fact, while it is most convenient to attach the siphon end of the tube 84 to the clean-out outlet 34 of the pump 28, it can conveniently be taken anywhere along conduit 46 between the pool outlet 26 and the pump inlet 32, or, alternatively, anywhere along conduits 48 or 52, if desired.

Additionally, the float chamber 58 includes only a single inlet 64 which receives recirculated pool water from the system 12 by siphoning or siphon action and not by direct pressure transfer, at a sub-level connection. Lastly, the only water 52 within the float chamber 58 is that siphoned through tube 84 from the recirculation system 12 of pool 16. None of the water 62 within the float chamber 58 flows back through the tube 84 to the recirculation system 12 of pool 16. The only water added to the recirculation system 12 is the water from the fresh water source under pressure in response to the control valve 74 operated by the recirculation mechanism or means 68 of the control system 14, as hereinafter described.

Figure 2:
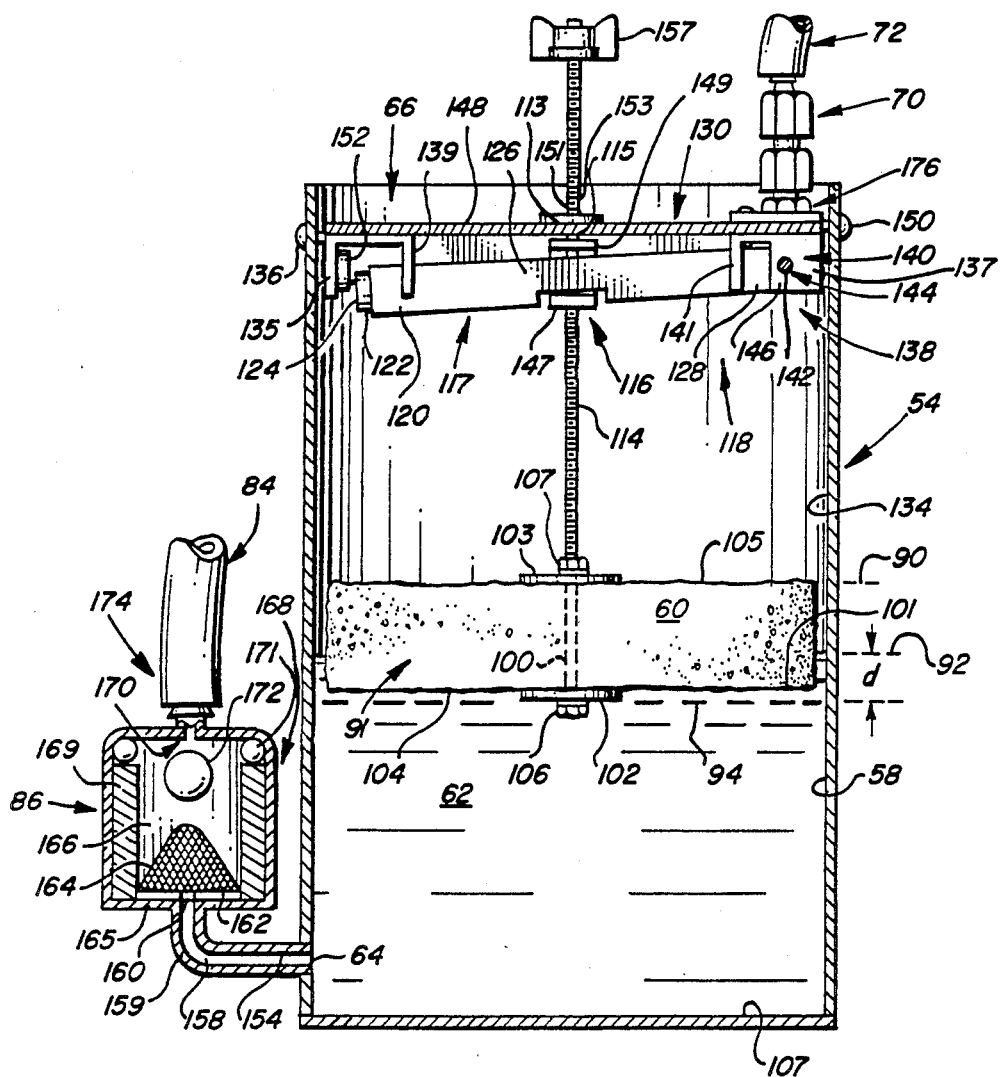
FIG. 2 is a sectional view of the float chamber housing, float, and actuation system of FIG. 1 of the present invention.

FIG. 2 is a sectional view of the float chamber housing 54 and the associated apparatus of FIG. 1, together with a sectional side view of the one-way valve apparatus 86 of FIG. 1 (greatly exaggerated in size for exclamation purposes only). In FIG. 2, the float chamber housing 54, which is preferably buried in the ground or surface material adjacent the pool 16 so as to straddle the water level 20 in the pool 16, includes a float chamber 58 in the general shape of a right cylinder. A disc-shaped float 60 is mounted therein for vertical reciprocal motion up and down in the float chamber 58 as the column of siphoned pool water 62 increases and decreases, as hereinafter described. The float level of the top, or bottom, or any given point on the float 60, may be thought of as being representative of the actual pool water level, and one such level in the float chamber then represents a predetermined desired float level indicative of the predetermined desired pool water level 22 of the pool 16 of FIG. 1.

For example, the level 92, representing the level of water supporting the float, can be used to establish the float level within the chamber 58. A predetermined distance "d" below the float level 92, indicative of the predetermined desired level of pool water 20, is represented by a predetermined desired float level 94, as hereinafter described. It will be seen that the water level within the pool determines the water level within the float chamber such that the water 62 within the float chamber 58 must fall or go down the predetermined distance "d" between the actual float level 92 and the predetermined float level 94 before the actuation mechanism 68 is activated, as hereinafter described, to prevent oscillating action or continuous attempts by the control apparatus 14 of FIG. 1, to adjust the water level for very minor fluctuations or deviations in the pool level.

An upper, rod-like, vertically-oriented member 114 has its lower end portion passing through a central aperture 100 of the styrofoam float 60. A lower, washer-like member 102 is received over the lower end of the rod 114 and disposed flush against the lower surface 104 surrounding the aperture 100. A nut 106 is threaded onto the lower end and secured thereto for holding the washer 102 and rod 114 in a fixed relationship to one another. An upper washer 103 is positioned over the rod 114 and disposed flush against the upper surface 105 of the float 60 and retained at this position by a nut 107 threaded over the rod 114 to secure the rod 114—washers 102, 103 combination for tightly securing the float 60 thereto.

FIG. 2 also shows a latch assembly 17 including a latch 118 and a latch housing 118. The latch 118 is an elongated rigid member having a generally U-shaped cross-section with the open end disposed downwardly. The moveable or free end portion 120 of the lever or beam 118 has a first magnet 124 rigidly secured to the distal end 122 thereof as by glue, adhesive means, or the like. The opposite or pivoted end portion 128 includes a pair of apertures 144 through the downwardly disposed sides of the lever for serving as the pivot point of lever 118 and the relatively less moveable end portion 143 extend to the end of lever 118.

A latch housing 119 includes an elongated housing 130 having a top 148 and front and rear sides 131, 133 distending downwardly therefrom to form an enclosure open only on the bottom for defining a housing channel for operatively receiving the lever 118 therein. The cross-section of the housing 130 is generally U-shaped and inverted with opposite longitudinal ends closed by end panels 135, 137 secured therein by adhesive means, screws, or any such conventional fastening means. A generally U-shaped inverted member 139 is secured to the top 148 and sides 131, 133 of the latch housing 119 parallel to and spaced apart from the end panel 135 so that the free end 120 of the lever 118 can be moved into and out of the inverted, downwardly-facing slot in the inverted, U-shaped member 139. A second magnet 152 is secured, as by adhesive means or the like, to the interior surface of the end panel 135 facing the first magnet 124 of the beam or lever 118 when their magnetic axes are aligned.

A second, generally U-shaped, inverted member 141 is secured to the inside top 148 and sides 131, 133 of the housing 119 parallel to and spaced apart from end panel 137. The pivoted end portion of the lever 118 is adapted to be received within the downwardly-facing slot or open end of the inverted U-shaped member 141. Another inverted U-shaped member 143 is fixedly mounted within the space between the member 141 and the end panel 137 with its top flush against the inside top surface of the housing 119. An aperture is provided through the top of member 143 and through the top 148 of latch housing 119. A plastic sleeve member is fitted within the aperture to form a downwardly-facing seat, as hereinafter described.

The intermediate or central portion 126 of the latch housing 119 has an aperture 113 having the elongated threaded rod or stem extending therethrough and a corresponding aperture in the top surface 145 of the lever 118. A nut-like member 147 is threaded onto the rod 114 to loosely secure the latch 118 within the housing 119 between the nut 147 and a washer 149 about the top aperture 113. There is sufficient spacing or "play" to enable the magnetic toggle action to occur without actually lifting float 60. A wing nut 157 or the like, is threadedly received over the top of the stem 114 to tighten over washer 149 to set the desired degree of play or looseness. A pivot pin 142 through pin apertures 144 enables the desired movement of the lever 118 with respect to the latch housing 119 and float 60.

As previously described with reference to FIG. 1, the float chamber housing 54, and therefore the float chamber 58, is provided with a single float chamber inlet 64 which may be coupled directly through the cylindrical walls 134 to the hollow interior 154 of a conventional inlet tube connector 155 and then into the interior 158 of the outlet 159 of the check valve 86 and an outlet vent or overflow relief vent 59. A circular disc 162 provides a base support to an inverted, conically-shaped filter or screen 164, and a central aperture 160 in the support 162 opens into the interior 158 of the outlet 159. The base support 162 of the screen 164 is supported by the annular shoulder portion 165 at the base of the valve body or housing 168. The screen or filter 164 serves to catch debris within the unfiltered pool water and prevent it from clogging the float chamber 58 or otherwise interfering with the operation thereof.

The body portion 168 of the one-way check valve 86 also includes a collar-like sealing member 169 and an O-ring 171 surrounding a central valve inlet aperture 170. Inlet 170 communicates directly with the hollow interior 154 of the tube-coupling means or nipple 156 and then to the hollow interior of the conduit 84. A spherical member or ball 172 is freely positioned within the hollow interior 166 of the valve body 168 and is responsive to pressure changes and the like so that the ball 172 is normally drawn or seated against the inlet aperture 170 by the suction in tube 84 provided by the suction side 30 of the pump 28, so long as the pump 28 is in operation. This serves to totally isolate the float chamber 58 from the recirculation system 12 so long as the pump 28 is in operation.

However, as soon as the pump 28 is turned off, by conventional timing means or the like, a momentary surge or impulse of water within the circulation system 12 passes through the conduit 84 and serves to unseat the ball 172 from the inlet or seat 170. The unseating enables a complete siphon path to be established between the circulation system 12, via the suction side outlet 84 of the pump 28, through tube 84, and the check valve 86, to the inlet 64 of the float chamber 58, so that the float chamber 58 can now freely siphon swimming pool water 62 from the recirculation system 12 until the actual water level within the pool 16 and the actual water or float level 92 within the float chamber 58 are equalized by the siphoning action.

Similarly, whenever the catch basket of the pump is cleaned, the closed recirculation path is broken and water flow through conduit 84 to unseat ball 172 and supply too much water to the float chamber 58. When the basket is recovered and the system reprimed, the high level of water in the float chamber 58 could cause a high flow velocity in the opposite direction causing ball 172 to seat in 170 and isolate the float chamber 58 in error. To avoid this, the overflow relief vent 59 is provided to prevent inadvertant valve closing. During such overfill conditions, once the closed recirculation system is normalized, the slow-moving, reverse siphon action will draw the excess water from the float housing 58 and into the pump 28 until the levels are again equalized, and since the reverse siphon flow is relatively slow, the ball 172 will remain unseated.

A conventional, internally-threaded nut member 176 serves as a coupling means to interconnect the portion of the actuation means 68 of FIG. 2 to the control relief valve outlet 72 from the relief valve, as hereinafter described.

Figure 3:
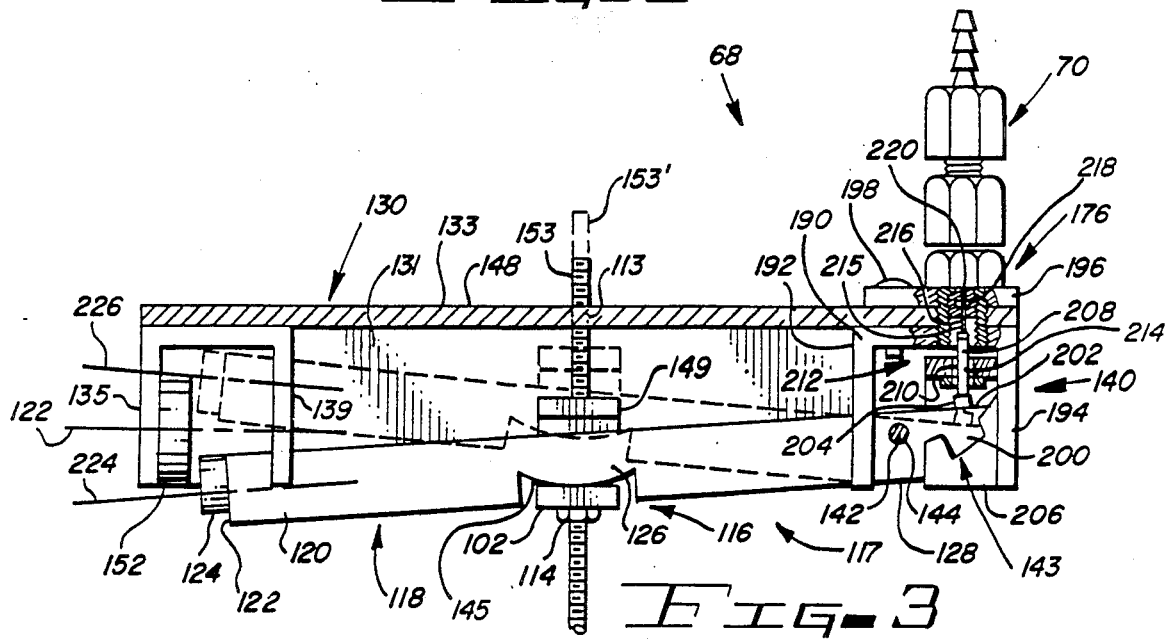
FIG. 3 is a sectional view of the latch and bleeder valve portion of the actuator system of FIG. 2.

FIG. 3 shows the actuation assembly 68 including a latch frame housing 119, a float lever assembly 117, pressure relief valve 70, and the components associated therewith, as previously described.

The fixed or pivoted end portion 128 of the lever 118 on the opposite side of the pivot pin 142 from the free end 120 includes a head-shaped portion 200 having a top support surface 202 fixedly mounting a contact member 204. The head-shaped portion 200 is free to move vertically up and down within the hollow interior 206 formed by the channel-forming member 143. The float 60 raises and lowers the head portion 200 of the lever 118 causing the contact 204, which carries the lower distal end portion of the needle assembly 212, to vertically reciprocate into an out of needle valve seat 218, thereby enabling the needle valve 70 to be normally-closed or sealed when the lever 18 is in the below-the-center or off-center-low toggle position, indicated by lever axis 224, while it is able to withdraw from the needle valve seat 218 when the head portion 200 pivots downwardly about the pin 142 when the lever 118 toggles or actuates to the over-the-center-high position, illustrated by lever axis 226. In this manner, the pressure relief needle valve 70 is normally deactuated or sealed from the atmosphere, but is opened to the atmosphere when the lever 118 toggles frm the non-actuated position axis 224 to the actuated lever position represented by axis 226.

It will, of course, be recognized that the magnet 124 on the distal end 122 of the free end 120 of the lever 118 and the magnet 152 mounted to the end panel 135 are set to face one another in like polarity. This causes a repelling force on either side of magnetic center, as illustrated by axis 222. The free end 120 of the lever 118 is guided to travel in an up and down position as it pivots about pin 142. Since the float 60 is attached to the rod 114 which is loosely secured about the mid-portion 126 of lever 118 by fastening means 116, the mid-portion 126 rises and falls with the float 60 and forces the free end 120 of the lever 118 to pivot about pin 142. This pivot action physically forces the magnets to align with the center or fixed axis 222 with the lever axis and repell each other into the actuated position, illustrated by axis 226, and vice versa, when the water level falls and the weight of the float pulls the lever axis to where it is again aligned with axis 222 causing it to flip or to be repelled away to the lower position, illustrated by the unactuated position magnetic axis 224.

The lever or armature 118 pivots in the fulcrum established at approximately an eleven-to-one ratio, in the preferred embodiment of the present invention, but many other fulcrum ratios can also be used. It will be noted that the linkage, including pin assembly 212, guide collar 208, and contact 204, together with the pivoted end of the latch housing 130, is used to open and close the pressure relief valve 70 is relation to which side of the magnetic field or axis 222 the lever or armature 118 is positioned on in response to the motion of the rod or float stem 114. The required water level differential for opening and closing the magnetic toggle pressure relief valve assembly in the actuator means 68 is approximately ½ inch of water, in the preferred embodiment of the present invention, although different water level differentials can easily be established using the magnetic toggle system of the present invention. The actual operation of the actuator means 68 of FIG. 3 will be hereinafter described with reference to operation of the pressure relief valve of FIG. 4 and the fresh water diaphragm control valve of FIG. 6.

Pressure relief valve 70 of FIG. 4 includes an upper body portion 230 having a generally cylindrical hollow interior or channel 238 therethrough. The upper body portion 230 includes an elongated, externally-threaded stem portion 232 and an internally-threaded head portion 234. The internal threads of the head portion 234 are formed in the interior of the head channel aperture 236. The valve 70 further includes a lower valve body portion 240 having a generally hollow interior channel which includes an elongated central channel 248 and an internally-threaded channel 250. The lower valve body portion 240 includes a first or upper, externally-threaded stem portion 242, an intermediate head portion 244, and a second or lower elongated stem portion 246 with the hollow interior extending through stem portion 242, head portion 244, and rim portion 246, via channels 248 and 250, respectively. The externally-threaded stem portion 242 of the lower body member 240 is adapted to be threadedly received within the internally-threaded head aperture 236 of the upper head portion 234. The externally-threaded stem portion 232 of the upper body portion 230 is adapted to be threadedly engaged within the internally-threaded lower end portion in the hollow interior 265 of the internally-threaded nut-like member 268. The opposite portion of the hollow interior 265 tapers to an aperture port 274 which communicates the tapered hollow portion 272 of interior chamber 265 to the hollow interior of the tube connector 276, as conventionally known in the art.

A coiled spring means 260 has a relatively wide base portion 266 seated against the tapered portion of the upper end of the hollow interior 265 of the head member 268 spring coils of decreasing diameter interconnecting the base coil portion 266 with a relatively common, lesser diameter, coil portion 262 with spring portion 262 extending through the hollow interior chamber 238 of the stem 232 of the upper body portion 230 and into the hollow interior 248 of the hollow stem portion 242 of the lower end portion 240. The plug-like member 252 is a generally cylindrical, externally-threaded portion 255 adapted to be threadedly engaged within the internally-threaded hollow interior 250 of the second stem 246 of the lower body portion 240. A generally tapered portion 253, integral with the portion 250 and in the general shape of a truncated cone having a tapering head 244, extends into the hollow interior 248 of the first stem portion 242 in the lower body portion 240. The lower end 261 of the relatively constant diameter coil portion 262 of the spring 260 is adapted to be seated on an annular support member 256 operatively carried by the truncated distal end portion of the cone 253. A hollow central channel 254 is provided through both the truncated conical portion 253 and the cylindrical portion 255 of the plug member 252. In the upper or actuated position, represented by axis 226, the pin 278 is removed from the seat 218 allowing the pressure relief valve 70 to be vented, and when the float 60 sinks to indicate a loss of water in the chamber, and hence the pool, stem 114 forces the movable magnet 124 to become aligned with the axis of the fixed magnet 118 and toggles it to the de-actuated position of axis 224 to close the seat 218 of the pressure relief valve 70 and actuate the control valve or diaphragm valve 74 to fill the pool.

The seat 218 communicates through the hollow interior channel 254 and the hollow interior of an extended guide portion 278 extending above the mounting platform 256 as a spring guide for positioning the lower coils 261 of the spring 260 and enabling the insertion or removal of the pin 216, the valve seat 218 to respectively seal and unseal the conduit or channel 254 for selectively unventing and venting the diaphram chamber of the control valve 74, via the hollow interior of the upper portion of the coiled spring 260, the chamber 265, the pressure relief output aperture 274, the hollow connector stem 276, and the connecting pressure relief tube 272 which extends to the control valve of FIG. 6, as hereinafter explained.

FIG. 5 illustrates a sectional side view of the flapper valve 50 of FIG. 1. In FIG. 5, the flapper valve 50 is shown as including a flapper valve body portion 280 having a hollow central interior or chamber 282 communicating with a hollow end or neck portion 284 which is externally-threaded to engage an internally-threaded portion of a cap-like connector 286 to provide a seal 288 about the flapper valve inlet 290. The opposite end portion of the flapper valve 50 includes an externally-threaded, hollow outlet neck 292 adapted to engage the internally-threaded portion of the cap-like member 296 which positions a seal 298 about the flapper valve outlet 294, as conventionally known in the art.

The hollow central portion 282 of the central body portion 280 of the valve 50 is provided with an internally-threaded aperture 300 adapted to receive the externally-threaded stem portion 304 of the fresh water inlet tube 80 which serves as the fresh water inlet 82 in the hollow interior 282 of the valve body 280. The coupling connector 306, is provided with an internally-threaded hollow interior which is adapted to couple or secure the end portion 80 to the threaded stem portion 304, as conventionally known in the art.

Fresh water under pressure is supplied from a source of fresh water through the conventional anti-siphon valve 76 of FIG. 1 and the control valve 74 of FIG. 6, as hereinafter described, and then through a tube or conduit 80 and inlet 82 to the hollow interior 282 of the central valve body portion 280 via the inlet aperture 302 at the distal end of the threaded stem portion 304. The hollow interior 282 of the central body portion 280 is provided with an annular shoulder 312 about the junction of the hollow interior 282 with the hollow interior of the stem portion 284, and a flapper valve is adapted to have the seal 316 positioned in the annular shoulder 312 and seated on the shoulder 312, for sealing the hollow interior 282 from the hollow interior of the stem portion 284. The flapper valve assembly 308 also includes a pivot attachment 310 for securing one portion of the seal portion 316 of the flapper valve 308 to the shoulder 312 at the junction 314 of the intersection of the hollow interior 282 of the central portion 280 and the hollow interior of the stem portion 284.

The flapper valve assembly 308 also includes a input portion 318 coupled to the seal portion 316 for movement therewith. The flapper valve assembly 308 is adapted to normally open the channel between the hollow interior 282 of the central valve body portion 280 and the hollow interior portion of the inlet neck 284 so that when pool water is being recirculated within the recirculation system 12, it can enter the inlet 290, pass through the hollow interior of the neck portion 280, into the hollow interior 280 of the central portion 280, and then through the hollow interior of the outlet neck 292 to the outlet 294 for normally recirculating same.

However, as soon as the pump 28 has stopped, the absence of pressure on the pressure side 36 of the pump 38 will enable the flapper valve assembly 308 to close and seat on the shoulder 312 to isolate the swimming pool water at the inlet 290 from the fresh water under pressure being provided from the input or inlet 82 through aperture 302 to the hollow interior 282 and via the hollow interior of the outlet within portion 292 to the outlet 294 and then through the recirculation system 12 to the pool itself for filling it with fresh water from the source. As long as fresh water is entering the inlet 302 to the hollow interior 282, the pressure of the incoming fresh water will maintain the flapper valve assembly 308 closed or seated on shoulder 312 to isolate the fresh water from the recirculated water at the inlet 290 and enable the fresh water to be fed to the pool 16 through the recirculation system 12. As soon as the pump 28 is actuated, the fresh water supply is terminated and the pressure of the water of the inlet 290 will open the flapper valve assembly 308 to once more conduct water through the flapper valve 50 for recirculation and filtering before being supplied back to the pool, as conventionally known. The purpose of the flapper valve 50 is to control the input of fresh water from components 80, 82, and 304 into 308 and then through the recirculation system 48, 40, 52, 24 via outlet 294 so as to prevent back pressure to the pump 28 via 62, 64, 86, 84 and 34 and prevent the unintentional buildup of water in the float chamber 58 causing erroneous float rise and actuation.

FIG. 6 illustrates, partially in section, the control valve assembly or diaphragm valve 74 of the present invention which controls the supply or input of fresh water under pressure to the swimming pool 16 via the recirculation system 12 of the system of FIG. 1, as previously described. FIG. 6 shows the diaphragm control valve 74 as including a generally cylindrical portion 320 having a fresh water inlet 322 adapted to be connected within the conduit 46, 48 or 52 of the recirculation system 12 of FIG. 1, via a conventional coupling device 324, well-known in the art. The fresh water inlet 322 is coupled directly to a fresh water inlet chamber 326 which outputs into a central input chamber 328. The outlet of the central chamber 328 is through an aperture 330 which communicates with a hollow longitudinal interior channel 332 having an elongated pin member 334 extending centrally therethrough. The flexible diaphragm 336 is used to separate the input body portion 320 of the valve assembly 74 from the mounting block portion 344, and the portion 379 insures that the area about the member 372 is sealed from the central inlet chamber 328. A coiled compression spring 338 has one end wrapped about the downwardly extending, annular portion 373 of mounting block 344 for securing it thereabout and restraining movement against the upper surface 342 of the mounted block 344 with the opposite coiled end portion of spring 338 being wrapped around the cylindical end portion 367 of a central portion 375.

A central or plug portion 375 includes an outwardly-extending flange portion 369 which clamps the resilient diaphragm or seal 336 against the annular shoulder portion 376, respectively, and against the upper end portions 378 of the outer portion 378. A stated above, the lower end of the spring 338 is coiled about the circular extension 367 of the central portion 375, and the base of the spring 338 is disposed upon the inner portion of the flange 369 so that the inner portion of the top surface 340 of the flange 369 insures that the diaphragm member 336 provides the necessary pressure seal between the upper chamber 350 and the lower chambers 328 and 362, respectively.

The central portion 375 also includes a hollow, elongated, internally-threaded stem portion 370 which is adapted to threadedly engage the external threads of the screw-like member 372 and is adapted to be secured therein for providing the input 330 and hollow passage 332 through the central portion 375, the diaphragm 336, and the hollow interior chamber 350 on the opposite side of the diaphragm 336. In addition to the collar or ring 373 positioning the upper end of the coil spring 338 against the base or mount 334, a central cylindrical portion 374 within the annular collar 373 secures the member 334 within the center of the spring 338, and the hollow central passage 332 to extend through the head of the member 372 and the inlet 330 of the hollow central inlet passage 328.

Control valve 74 of FIG. 6 also includes an outlet 366 adapted to be operatively coupled to the fresh water conduit or pipe 80 of FIG. 1, via conventional coupling means 364. The outlet 366 communicates with the outlet passage 360 in the generally hollow, interior, of the central body portion 362 of the valve 74. The outlet passage 360 communicates with the vertical passage 362 having a relatively narrow outlet conduit 363 which is normally sealed by the diaphragm 336 from the hollow interior 365 of the chamber 350 and on the opposite side thereof. An additional conduit or pipe 356 connects the outlet chamber 360 with the upper chamber inlet 352 to chamber 365. This passage is blocked or sealed by the member 358 for preventing its use in the present application.

As long as the diaphragm chamber 350 is vented through the hollow stem connector 276 and the conduit or tube 72, the water pressure in the inlet chamber 326 shall lift the seal 379 so as to allow the control valve 74 to remain open. However, when the outlet at the hollow stem connector 276 is unvented, which is controlled by the pressure relief valve 70 as previously described, the pressure is supplied through the passage 330 to hydraulically force the diaphragm 336 down to seat the seal member 379 on the shoulder at the top of the inlet chamber 328 which closes the control valve. Therefore, when the pressure relief valve 70 is open, the control valve is vented and consequently opened, but when the pressure relief valve 70 is closed, the control valve is unvented and therefore closes.

In the preferred embodiment of the present invention, the hydraulic refilling valve or diaphragm control valve 74 of FIG. 6 is preferably a modified Richdel, and preferably an electric solenoid-operated valve model number 1204. The valve is normally designed to be self-actuating by an inside flow pressure alone.

In operation, the diaphragm control valve 74 of FIG. 6 has an inlet 322 which couples to a fresh water source which is city water. The fresh water moves through the inlet 322 into the inlet chamber 326 where the pressure builds up to lift the seal member 379 which is attached to the diaphragm 336 from the shoulder atop the central vertical chamber 328. This allows the fresh water to pass through the outlet between the shoulder portion at the top of the chamber 328 into the outlet chamber 362. From the outlet chamber 362, the water travels through the outlet 366 to the pool 16 via conduit 80 to valve 50 and then through conduits 48, the filter 40, and conduit 52 to the pull inlet 24.

At the same time, the coil spring 338 exerts downward pressure on the diaphragm 336 which causes a small portion of the water to pass through the inlet 330 of the diaphragm chamber 350 which causes pressure to build up in the diaphragm chamber 350. Using the principles of hydraulics, which are commonly known in the art, this forces the diaphragm 336 and consequently the seal member 379 to move down against the water flowing through the outlet between the central chamber 328 and the outlet chamber 362 until the seal member 379 seats against the shoulder at the top of the central chamber 328 sealing off the flow of water. However, when the diaphragm chamber 350 is vented via the outlet through the stem 376 and conduit 72, which is controlled by the pressure relief valve 70 previously described, via conduit 72, the pressure is released from the diaphragm chamber 350. At that time, the pressure in the inlet chamber 328 is free to lift the seal member 379 vertically upward and allow the water to pass from the chamber 328 to the outlet chamber 362 via the opening between the bottom of the seal member 379 and the top shoulder portion of the vertical central inlet 328. As long as the diaphragm chamber 350 is vented, the water pressure in the inlet chamber 328 will continue to lift the seal member 379 above the shoulder to allow the control valve 74 to remain open. When the outlet at connector 276 is unvented under control of the pressure relief valve 70, the pressure applied through the passage 330 will hydraulically force the diaphragm 336 down to seat the seal member 379 on the shoulder to close the control valve.

In the normal operation of the Richdel electric valve, an electric solenoid is actuated to lift a plunger which normally covers the relief vent 356, since the valve is normally-closed in ordinary operation, and the plunger normally covers the relief vent 356 to prevent operation of the valve 74. However, the system of the present invention modifies the Richdel electric valve by placing a stop member or plug 358 in the relief passage 356 to disable same. The electric solenoid system is removed and replaced by a relief tube 72, and the pressure relief valve 70 of FIG. 4, as previously described. The pressure relief valve opens in command to pressure applied to the fluid mechanism, and the positioning of the magnets on the free end of the lever, as previously described.

The hydraulic refilling valve or control valve 74 is connected by a pipe or tube 72 to a swing check valve or anti-siphon valve 76 which is normally installed in most swimming pool plumbing systems. The purpose of this valve 74 is to assure a flow of fresh water when the hydraulic valve 74 is open so that no dirty pool water can flow back into the source of fresh water for contaminating same. This also assures that it does not interfere by being pressurized at the pump where the siphoning principal is in the process of monitoring and detecting the water level in the pool. Therefore, the swing check or anti-siphon valve is installed at the outlet side of the pump, and may be, for example, an anti-siphon valve such as that manufactured by Flow Control Corporation which is modified by installing an injection pipe at the front of the swing check portion so that when the water enters from the hydraulic refilling valve, it forces the swing check or flapper valve to close and prevents the siphon loop from being pressurized during the refill cycle. This assures accurate level sensing or monitoring during the filling cycle itself.

The check flow valve 86 of FIG. 2, as previously stated, includes a free-floating check ball or sphere 172 which, in the normal condition, will fall and have its path limited by the screen barrier or member 164 so that it does not seal the outlet 160 in the base 162. When the pump 28 is turned on, however, the suction from the suction side of the pump will attract or draw the check ball to the seated position to isolate the float chamber from the recirculation system during pump operation. Of course, the position of the check valve can be altered so as to enable it to function on the pressure side of the circulation pump by turning the valve in the opposite direction. This is functional, but the suction side is recommended, in the preferred embodiment, so as to take advantage of the inertial surge of water to cleanly open the valve and remove any possible air in the siphon tube initially so that siphoning can begin quickly for level equalization.

The reverse flow prevention valve or anti-siphon valve 76 may also be a conventional unit, such as that manufactured by Flow Control, Inc. and it is not modified in its use in the present invention. Its function is simply to be secured to the inlet side of the hydraulic refilling valve to prevent the reverse flow of contaminated pool water into the fresh water supply in the even of a drop in the water pressure.

Further, the system could, of course, be altered to replace the magnetic toggle pressure relief valve assembly with a floating magnetic read switch, micro-switch, or the like. With slightly less effective results, the switch could also act in direct response to the float position in the float vessel. It could, for example, be connected in series with a 24 V AC supply so as to be electrically activated, as known in the art. The valve could also be modified and a vacuum switch could be installed at the suction side of the pump to make and break the circuit in the event the pump should start during the filling operation. The system could also be modified by supplying it with a solar electric storage or DC solenoid and this would require further use of a solenoid for the plunger action and stop another solenoid to release the catch. Regardless, a number of obvious modifications can be made in the actual valve used in the present invention and in the actuation means without significantly altering the basic concept of the present invention. Although the magnetic toggle or latch is unique in and of itself, at least to the present inventors and for use in water level-detecting and adjusting systems variations can be made therein.

In summary, therefore, the present invention contemplates an improved system for monitoring the actual level of water in the pool; for detecting when the level falls at least a predetermined distance below a predetermined desired level of water; and for controlling the input of fresh water under pressure into the pool for restoring the water level therein to said predetermined desired pool water level.

The system of the present invention involves the means for circulating the pool water between a pool outlet and inlet and locating a float chamber at least partially below the pool water level so that the position the float within the chamber is indicative of the actual pool water level. The system further involves the means for siphoning pool water from the recirculation system whenever the pump stops for filling the float chamber to position the float at a level indicative of the actual level of water in the pool, and then adding fresh water under pressure to the pool whenever the float position indicates that the pool water level has fallen at least a predetermined distance below the predetermined desired level, and for terminating the addition of fresh water under pressure to the pool whenever the float position indicates that the actual level of water in the pool has been restored to the predetermined desired level.

The operation of the present system also contemplates the siphoning of pool water from the recirculation system or the pool itself to fill the float chamber so that the equalized levels indicate the actual level of water in the pool for monitoring and detection purposes and for normally-isolating the float chamber from the recirculation system whenever the pump is in operation, but for enabling the siphoning operation to go on immediately after the pump is turned off and the initial surge of the circulating water causes by the inertia thereof opens the one-way valve and hence the siphoning path.

The use or employment of the siphoning system, principle, or concept in the present invention, enables the present system to be used and installed without requiring extensive excavation or digging in the terrain or ground surrounding the pool since the connection between the float chamber and the pool does not have to be made directly between the two at some point or position beneath the actual water level in the pool and, in fact, below the lowest water level that the pool will reach prior to refilling. Furthermore, since the direct pressure of the pool water itself is not used to supply the pool water to the float chamber, the connection can be made even above ground to siphon the pool water from the conduit coupling to the pool outlet to the suction side of the pump but it can also be made anywhere in the recirculation system even on the opposite side of the pump between the pump outlet and the pool inlet, if desired, with minor modifications as previously described.

The present system is such simpler, easier to operate, easier to maintain, and less costly to install than the systems of the prior art. Since no extensive excavation is necessary and no direct pressure drive connection, is required the cost for maintainability is considerably reduced immediately. Furthermore, the system does not require special purpose valves for full bi-directional flow or the like, since a single connection is made between the fresh water supply line and the recirculation system for supplying fresh water to the pool and a single connection is made between the recirculation system and the float chamber for two-way siphon flow only for monitoring and detecting pool levels. The present system does not use a float chamber as a mixing point or inlet for supplying fresh water to the system, nor is full two way flow allowed between the recirculation system and the control system itself, thereby enabling a simple siphon flow path and a single inlet in the float chamber, which again reduces costs and maintainability. Furthermore, the input of fresh water into the float chamber interferes with the ability to monitor and detect the actual pool level during the filling operation itself, and adds considerable confusion and inaccuracy to the overall operation.

Applicant provides a unique apparatus for monitoring, detecting and maintaining or controlling the water level in the pool to insure that the system is periodically restored to a predetermined desired water level utilizing an relatively low cost, easy-to-maintain, easy-to-install, and extremely simple system to do so.

While the present invention has been particularly described and illustrated with reference to the preferred embodiments of the present figures, it will be understood by those skilled in the art that various changes variation, alteration, substitions, and modifications can be made in form, structure, detail, and operation, without departing from the actual spirit and scope of the present invention, which is limited only by the appended claims.

I claim:

1. An automatic control system for use in a swimming pool type system having a swimming pool, a pool inlet, a pool outlet, a swimming pool water circulation system including filter means for cleaning the circulated pool water and having a portion thereof above said pool, said control system adapted to be operatively coupled to at least one of said swimming pool and said swimming pool water circulation system for detecting whenever the level of water in the swimming pool is below a predetermined desired level and for controlling the input of fresh water under pressure into the pool in response to the detected level for automatically restoring the water in the pool to said predetermined desired level comprising:

a float chamber housing means adapted to be operatively disposed at least partially below the water level in said pool;

said float chamber housing means including a float chamber, a float chamber inlet means for inputting only swimming pool water siphoned from said swimming pool;

siphon circuit means having one end connected to said float chamber inlet means and an opposite end adapted to be connected to said pool circulation system above said pool water level for siphoning pool water to a level above that of said pool water and then through said float chamber inlet means into the float chamber until the water level therein is equal to the actual water level in said swimming pool;

a source of fresh water under pressure;

float means operatively disposed within said float chamber for monitoring the float level therein as a measure of the water level in said swimming pool;

actuation means responsive to said float means falling at least a predetermined amount below a float level indicative of said predetermined desired level for initiating a command signal and to said float means returning to a float level indicative of said predetermined desired level for terminating said command signal;

second conduit means operatively coupling said source of fresh water under pressure to said pool water circulation system, having control valve means operatively disposed within said second conduit means for selectively controlling the flow of fresh water into the pool, said control valve means being responsive to said command signal for supplying fresh water to said pool each time the pool level is detected to be at least a predetermined amount below said predetermined desired level and being responsive to the termination of said command signal for turning off the supply of fresh water into the pool whenever the pool level has been restored to said predetermined desired level thereby automatically monitoring and controlling the level of water in said pool.

2. The automatic control system of claim 1 wherein said water circulation system includes a pump means for circulating said pool water, said pump means including a suction side having a pump inlet and a pressure side having a pump outlet, and wherein said siphon conduit means is operatively coupled to said at least one of said pool and said water circulation system intermediate said pool outlet and said pump inlet for siphoning pool water from said water circulation system to said float chamber.

3. The automatic control system of claim 1 wherein said siphon conduit means includes a conduit inlet means operatively coupled to said water circulation system, a conduit outlet means operatively coupled to said float chamber inlet means and a check valve means for normally isolating said float chamber from said water circulation system whenever said pump means is operating and responsive to a surge of water within the water circulation system which is caused when said pump means is shut off for opening a pool water-conducting siphon path through said conduit means for enabling said float chamber to thereafter siphon pool water from said water circulation system through said siphon conduit means and into said float chamber until the pool water level is equal to said indicative float level in said float chamber.

4. The automatic control system of claim 3 wherein the level of said siphon conduit inlet means is below the water level in said pool.

5. The automatic control system of claim 3 wherein said siphon circuit inlet means is coupled to said circulation system at a location above the water level in said pool and said siphon conduit outlet means is located below the level of water in said pool.

6. The automatic control system of claim 3 wherein said one-way valve means includes a valve body having at least a sealing surface; spindle means having a spindle operatively disposed within said valve body for sealably contacting said at least one sealing surface in response to the surge of circulating pool water in said water circulation system and said first one-way conduit means resulting when said pump means is turned off, and bias means for spacing said spindle means away from said sealing surface until said pressure surge occurs so that siphoning can begin in said one-way valve means.

7. The automatic control system of claim 6 wherein said actuation means further includes latch means for loading said needle relative to said seat aperture so that a delay in the motion of said needle relative to said seat aperture is provided in response to the change in the level of water in said float chamber.

8. The automatic control system of claim 7 wherein said latch means further includes
a latch housing means;
a lever means having a free end and an opposite end portion pivotally coupled to said latch housing means;
the opposite end portion of said lever means further having said needle for reciprocally moving same;
means for operatively coupling said needle to said latch housing means for enabling reciprocating motion between open and closed seat positions;
needle for sealing said seat aperture when said water is at said predetermined desired level;
means for coupling said lever means to said float; and
means contacting said free end of said lever for loading said free end so that said spring means tends to move said lever over center from a neutral position in response to the position of said float means.

9. The automatic control system of claim 8 wherein said contacting means of said latch means further includes magnetic means having a first portion operatively coupled to said float chamber housing means and having a second portion operatively coupled to said free end for normally magnetically attracting to position said needle against said seat aperture so that the water level in said chamber must drop said substantial predetermined amount prior to overcoming the action of said magnetic means and opening said seat aperture.

10. The automatic control system of claim 1 wherein said water circulation system is unvented to atmosphere for enabling said float chamber to siphon pool water therefrom.

11. The automatic control system of claim 10 wherein said float chamber is vented to atmosphere.

12. The automatic control system of claim 11 wherein said float chamber is generally cylindrical and includes means for forming an overflow relief vent therein and said float is a right cylinder having a diameter slightly less than the inside diameter of said cylindrical float chamber enabling said float to rise and fall within the float chamber supported by the siphoned water contained therein.

13. The automatic control system of claim 1 wherein said siphon conduit means includes siphon conduit inlet means operatively coupled to said water circulation system at any position therealong.

14. The automatic control system of claim 1 wherein said control valve means includes a diaphragm valve having an inlet operatively coupled to said source of fresh water under pressure operatively coupled to at least one of said pool and said pool water circulation system through said second conduit means, said diaphragm valve including diaphragm valve actuation means having an actuation chamber for normally closing said diaphragm valve when inlet pressure accumulates in said accumulation chamber to a predetermined pressure and vent means operatively coupled to said float means for permitting said valve actuation chamber to be drained in response to said float falling below said predetermined desired level to open said diaphragm valve and permit fresh water under pressure to flow into said pool.

15. The automatic control system of claim 14 wherein said float chamber includes a seat aperture opened to said vent means and needle means coupled to said float for sealing said seat aperture when the water level in said float chamber rises to said predetermined desired level and for opening said seat aperture whenever the water in said float chamber falls at least said predetermined amount below said predetermined desired level.

16. The automatic control system of claim 1 wherein said second conduit means includes an anti-siphon valve means for preventing the pool water from contaminating the fresh water supply and the outlet of said second conduit means is operatively coupled only to at least one of said pool and said water circulation system and not to said chamber means.

17. In a swimming pool system including a swimming pool containing water and having a predetermined desired pool water level and further including at least one pool water outlet and at least one pool water inlet, a water circulation system operatively coupling said at least one pool water outlet to said at least one pool inlet, said circulation system including a pump means having a suction side and a pressure side. a filter means for filtering the circulated pool water, said filter means having a filter inlet and a filter outlet, a first conduit means operatively coupling said pool water outlet to the suction side of said pump means, a second conduit means operatively coupling the pressure side of said pump means to said filter inlet, a third conduit means operatively coupling said filter outlet to said pool inlet, actuatable valve means operatively coupled in said at least one of said first second and third conduit means for normally conducting circulated swimming pool water and responsive to an actuation command for operatively coupling a source of fresh water to said water circulation system for adding fresh water to said swimming pool for restoring the level of water in said swimming pool to said desired level, the improvement comprising an automatic pool water level control system comprising:

a float chamber housing means including a float chamber means for containing only pool water siphoned from said water circulation system, said float chamber housing means being operably disposed at least partially beneath the level of the water in said swimming pool and such that the water level within said float chamber means will automatically adjust to the water level in said swimming pool by siphoning pool water from said water circulation system into said float chamber means until the water levels are equal, said float chamber means having a single water inlet means for receiving water siphoned from said water control system, a fourth conduit means operatively coupling said water circulation system to said single water inlet means for siphoning said swimming pool water to a level above that of the pool water level and then into said float chamber means, a float means for monitoring the water level in said float chamber means, actuation means responsive to said float means falling at least a predetermined distance below said desired level in response to the presence of a low water level in said swimming pool for initiating an actuation command for enabling said valve means to admit fresh water under pressure into said swimming pool to raise the level of water therein, said actuation command being terminated whenever said float means rises within said float chamber means the level corresponding to said predetermined desired level for the activation said valve means to terminate the addition of fresh water to said pool and maintain said predetermined desired level of water therein.

18. The improved pool system of claim 17 wherein said fourth conduit means includes a fourth conduit inlet means and a fourth conduit outlet means, said fourth conduit outlet means being operatively coupled to the sole input of said float chamber means and the fourth conduit inlet being operatively coupled to said water circulation system at at least one of said pool outlet, the first conduit means, and the suction side of the pump.

19. The improved pool system of claim 17 wherein the inlet of said fourth conduit means is operatively coupled to said water circulation system on the suction side of the pump means.

20. The improved pool system of claim 17 wherein the inlet of said fourth conduit means is operatively coupled to said water circulation means on the pressure side of said pump means.

21. A remote automatic pool level adjusting apparatus for a swimming pool having a pool inlet, a pool outlet, a filter system, a water circulation system operatively coupled between the pool outlet and the pool inlet and including a filter system for cleaning the pool water, a pump operatively disposed in said water circulation system and intermittedly driven for circulating pool water for filtering same, said pool level adjusting apparatus comprising:

float chamber housing means including a float chamber having a float operatively mounted therein generally adapted to be disposed at least partially beneath the water level in said swimming pool;

means for operatively coupling said float chamber to said water circulation system for siphoning water from said pool and through at least a portion of said water circulation system to a level above the pool water level and then into said float chamber when said pump is not operating and for isolating said float chamber from said said pool whenever said pump is operating;

float means supported upon the siphoned water within said float chamber for monitoring the water level in said pool; and a source of fresh water normally-closed source valve means operatively coupling said source of fresh water to at least one of said pool and said water circulation system, said source valve means being actuated by said float means fcr adding fresh water to the pool whenever the float means falls at least a predetermined distance below the predetermined desired level and for terminating the addition of water to the pool whenever the water level in said float chamber has been restored to said predetermined desired water level.

22. The apparatus of claim 21 wherein said float means includes a housing provided with an atmospherically vented internal float chamber astride the water level in said pool and a float situated in said chamber for floating upon the siphoned water from said water circulation system such that the water level which said float means is supported is indicative of the actual water level in said pool.

23. Apparatus of claim 22 wherein said float means includes isolating valve means for normally isolating the float chamber from said water circulation system when the pump is operational and for enabling siphoning between the water circulation system and the float chamber when the operation of the pump ceases.

24. The apparatus of claim 23 wherein the source valve means includes:
 a diaphragm valve having an inlet connected to said source of water under pressure and an outlet open to said pool;
 said diaphragm valve being provided with actuation means including an actuation chamber for normally closing said diaphragm valve when inlet pressure accumulates in said accumulation chamber; and
 vent means connected to said float means for permitting the actuation chamber to be drained to thereby open said diaphragm valve and permit the fresh water from said source to be added to said pool.

25. The apparatus of claim 24 wherein said float means further includes said housing having a seat aperture open to said vent means and needle means operatively coupled to said float means for sealing said seat aperture when the water level in said float chamber rises to said predetermined desired level and for opening said seat aperture when the water level in said float chamber falls at least a predetermined distance below said predetermined desired level.

26. The apparatus of claim 25 wherein said isolating valve means includes a valve body having at least a sealing surface;
 spindle means having a spindle located in said valve body for sealably contacting said at least one sealing surface in response to a serge of pressure through said isolating valve means caused by the serge of pressure in said water circulation system when said pump is turned off; and
 bias means for spacing said spindle from said sealing surface until said surge of pressure occurs so that siphoning can occur between the float chamber and the water circulation system only after said surge of pressure opens said valve in response to the pump being turned off.

27. The apparatus of claim 26 wherein said float means further includes latch means for loading said needle relative to said seat aperture so that a delay in the motion of the needle relative to the seat aperture is provided in response to a change in the level of water in said float chamber.

28. The apparatus of claim 27 wherein said latch means further includes a lever having a free end and a terminal pivotably coupled to said housing;
 said lever further having a medial point pivotally coupled to means for engaging said needle;
 said lever having a coupling to said float and wherein said latch means further includes magnetic means having a first portion coupled to said housing and having a second portion coupled to said float means for magnetically attracting said needle against said seat aperture so that the water level in said chamber must drop a predetermined distance prior to overcoming the action of said magnetic means thereby providing a delay to permit oscillating and the like.

* * * * *